US009836535B2

United States Patent
Wang et al.

(10) Patent No.: US 9,836,535 B2
(45) Date of Patent: Dec. 5, 2017

(54) METHOD AND SYSTEM FOR CONTENT RETRIEVAL BASED ON RATE-COVERAGE OPTIMIZATION

(71) Applicant: TCL RESEARCH AMERICA INC., San Jose, CA (US)

(72) Inventors: Haohong Wang, San Jose, CA (US); Guanghan Ning, San Jose, CA (US); Zhi Zhang, San Jose, CA (US); Xiaobo Ren, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 353 days.

(21) Appl. No.: 14/835,004

(22) Filed: Aug. 25, 2015

(65) Prior Publication Data

US 2017/0060862 A1 Mar. 2, 2017

(51) Int. Cl.
*G06F 17/30* (2006.01)
(52) U.S. Cl.
CPC .............................. *G06F 17/30784* (2013.01)
(58) Field of Classification Search
CPC ................................................ G06F 17/30784
USPC ............................................................ 707/722
See application file for complete search history.

(56) References Cited

U.S. PATENT DOCUMENTS

| | | | | |
|---|---|---|---|---|
| 4,677,466 A * | 6/1987 | Lert, Jr. | ............. | G06K 9/00711 348/E7.024 |
| 8,266,142 B2 * | 9/2012 | Jiang | ................. | G06F 17/30743 707/725 |
| 8,611,701 B2 * | 12/2013 | Zhang | ............... | G06F 17/30781 382/305 |
| 8,924,476 B1 * | 12/2014 | Granstrom | ........ | G06F 17/30044 709/204 |
| 9,047,371 B2 * | 6/2015 | Mohajer | ........... | G06F 17/30743 |
| 2008/0270373 A1 * | 10/2008 | Oostveen | .......... | G06F 17/30825 |

(Continued)

OTHER PUBLICATIONS

Esmaeili et al., "Fast Matching for Video/Audio Fingerprinting Algorithms", The 2011 IEEE International Workshop on Information Forensics and Security (WIFS '2011), 2011, 6 pages.*

(Continued)

*Primary Examiner* — Phuong Thao Cao
(74) *Attorney, Agent, or Firm* — Anova Law Group, PLLC (57) ABSTRACT

A content retrieval method including: extracting a plurality of fingerprints including a plurality of video fingerprints and audio fingerprints from contents stored in a content database; determining representative video fingerprints of the video frames and representative audio fingerprints of the audio sequences; determining a data rate indicating a storage limitation and a coverage indicating a number of searching results to be returned; storing selected representative video fingerprints and representative audio fingerprints based on the storage limitation indicated by the data rate in a fingerprint database; receiving a query containing at least one of video data and audio data submitted by a user; extracting at least one query fingerprint representing the query; determining a number of fingerprints most matching the query fingerprint based on the coverage to generate search results indicating matching contents represented by the number of most matching fingerprints; and returning the search results to the user.

20 Claims, 5 Drawing Sheets

(56) References Cited

U.S. PATENT DOCUMENTS

| | | | |
|---|---|---|---|
| 2009/0063277 A1* | 3/2009 | Bernosky | G06F 17/3002 705/14.73 |
| 2009/0259926 A1* | 10/2009 | Deliyannis | G06F 17/3002 715/205 |
| 2009/0305680 A1* | 12/2009 | Swift | H04L 43/00 455/414.1 |
| 2009/0324026 A1* | 12/2009 | Kletter | G06K 9/00442 382/124 |
| 2009/0324100 A1* | 12/2009 | Kletter | G06K 9/00442 382/217 |
| 2010/0171879 A1* | 7/2010 | Zhang | G06F 17/30781 348/571 |
| 2010/0268628 A1* | 10/2010 | Pitkow | G06F 21/10 705/34 |
| 2010/0287196 A1* | 11/2010 | Shields | G06F 17/30781 707/769 |
| 2010/0303366 A1* | 12/2010 | Zhang | G06F 17/30781 382/218 |
| 2010/0318515 A1* | 12/2010 | Ramanathan | G06F 17/30799 707/723 |
| 2011/0026763 A1* | 2/2011 | Diggins | G10L 25/00 382/100 |
| 2011/0128445 A1* | 6/2011 | Carrieres | H04N 17/00 348/512 |
| 2011/0299721 A1* | 12/2011 | He | G06K 9/00744 382/100 |
| 2011/0311095 A1* | 12/2011 | Archer | G06K 9/00744 382/100 |
| 2013/0152126 A1* | 6/2013 | Shkedi | H04N 21/812 725/34 |
| 2013/0160038 A1* | 6/2013 | Slaney | H04N 21/233 725/14 |
| 2013/0251189 A1* | 9/2013 | McMillan | H04H 20/14 382/100 |
| 2013/0290502 A1* | 10/2013 | Bilobrov | G06F 21/10 709/223 |
| 2014/0164111 A1* | 6/2014 | Rodriguez | G06Q 30/0255 705/14.53 |
| 2014/0236988 A1* | 8/2014 | Harron | G06F 17/30047 707/769 |
| 2015/0163545 A1* | 6/2015 | Freed | H04N 21/44008 725/19 |
| 2015/0289013 A1* | 10/2015 | Nelson | H04N 21/44213 725/19 |
| 2015/0365722 A1* | 12/2015 | Oztaskent | H04N 21/44213 725/18 |
| 2015/0373281 A1* | 12/2015 | White | G06F 3/0482 348/660 |
| 2016/0066032 A1* | 3/2016 | Grant | G06F 17/30017 725/19 |
| 2016/0132500 A1* | 5/2016 | Pereira | G06F 17/30029 707/770 |
| 2016/0261932 A1* | 9/2016 | Fadell | H04Q 9/00 |
| 2016/0267178 A1* | 9/2016 | Wang | G06F 17/30784 |
| 2017/0264952 A1* | 9/2017 | Nelson | H04N 21/44213 |

OTHER PUBLICATIONS

Senechal et al., "Audio, Video, Audio-Visual Signatures for Short Video Clip Detection: Experiments on Trecvid2003", The 2005 IEEE International Conference on Multimedia and Expo (ICME 2005), 2005, 4 pages.*

* cited by examiner

METHOD AND SYSTEM FOR CONTENT RETRIEVAL BASED ON RATE-COVERAGE OPTIMIZATION

FIELD OF THE INVENTION

The present invention relates generally to the field of computer technologies and, more particularly, to techniques for video/audio content retrieval based on data rate-coverage optimization.

BACKGROUND

In recent years, the availability and scalability of multimedia resources on the internet has grown tremendously. Thus, the development and advancement of audio and video information retrieval technologies are becoming more and more significant and popular. However, existing methods often are concentrating on either visual content or audio content individually, and often lack proper ways to combine visual and audio information.

Further, according to the present disclosure, in practice, a system to deal with intensive multi-task may require that the information used to retrieve contents be minimized as much as possible. Audio retrieval may require smaller bitrates but its response time may be longer due to the nature of sound compared to more informative two dimensional video frames. It may be desired to optimize the bit flow such that the bitrate may be minimized whilst optimized retrieval performance may be kept.

The disclosed methods and systems are directed to solve one or more problems set forth above and other problems.

BRIEF SUMMARY OF THE DISCLOSURE

One aspect of the present disclosure includes a content retrieval method. The method includes extracting a plurality of fingerprints including a plurality of video fingerprints and a plurality of audio fingerprints from contents stored in a content database. The contents have video frames corresponding to the video fingerprints and associated audio sequences corresponding to the audio fingerprints. The method includes determining representative video fingerprints of the video frames and representative audio fingerprints of the audio sequences; determining a data rate indicating a storage limitation and a coverage indicating a number of searching results to be returned; and storing selected representative video fingerprints and representative audio fingerprints based on the storage limitation indicated by the data rate in a fingerprint database. The method also includes receiving a query containing at least one of video data and audio data submitted by a user; extracting at least one query fingerprint representing the query; determining a number of fingerprints most matching the query fingerprint based on the coverage to generate search results indicating matching contents represented by the number of most matching fingerprints; and returning the search results to the user.

Another aspect of the present disclosure includes non-transitory computer-readable medium having computer program for, when being executed by a processor, performing a content retrieval method. The method includes extracting a plurality of fingerprints including a plurality of video fingerprints and a plurality of audio fingerprints from contents stored in a content database. The contents have video frames corresponding to the video fingerprints and associated audio sequences corresponding to the audio fingerprints. The method includes determining representative video fingerprints of the video frames and representative audio fingerprints of the audio sequences; determining a data rate indicating a storage limitation and a coverage indicating a number of searching results to be returned; and storing selected representative video fingerprints and representative audio fingerprints based on the storage limitation indicated by the data rate in a fingerprint database. The method also includes receiving a query containing at least one of video data and audio data submitted by a user; extracting at least one query fingerprint representing the query; determining a number of fingerprints most matching the query fingerprint based on the coverage to generate search results indicating matching contents represented by the number of most matching fingerprints; and returning the search results to the user.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Given the exploding amount of multimedia content that is becoming available over the Internet, it is a fast increasing demand to effectively organize and instantaneously retrieve the content. For instance, it is quite convenient to search several words or paragraphs by utilizing search engines. However, it becomes quite a different situation if given an interesting clip of video with no prior knowledge, where users may have trouble describing it semantically and most of the efforts may result in void.

To create a reliable content (e.g., video) retrieval system is not a trivial task. First of all, the content retrieval needs to be made possible by making use of either audio or visual information. For audio retrieval, the first step may involve isolating a sequence of "feature" in the piece of audio. This set of feature is said to be the "fingerprint" of the audio sequence.

The concept of fingerprint, when used in audio retrieval systems, is the function to map an audio object that consists a large number of bits to a limited number of bits which could be called fingerprint, which needs to be sufficiently distinguishable, so that two fingerprints can be reliably separated from each other or regarded similar to each other.

For video retrieval, a single image frame from a video sequence may be discriminable enough to be searched in a large dataset. This enables each frame itself being an independent unit, regardless of what inter-frame information is. Thus, proper frames or representative frames may be used instead of collecting all of the continuous frames for database search, redundant inter-frame information may be unnecessary.

The term "video fingerprinting" may refer to a technique in which software identifies, extracts, and then compresses characteristic components of a video, enabling that video to be uniquely identified by its resultant "fingerprint". Such technique may include key frame analysis, color and motion changes sequential analysis, feature and object analysis, camera shot analysis, etc., and the analysis results may then be used as the fingerprints of the video sequence.

Figure 1:
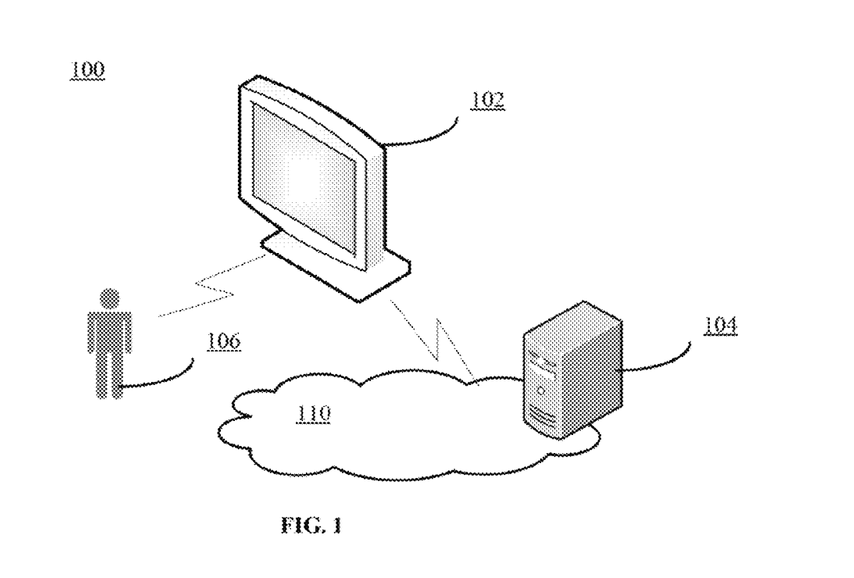
FIG. 1 illustrates an exemplary environment incorporating certain embodiments of the present invention.

As the Internet content often involve both audio and video, the present disclosure provides a content retrieval system based on video/audio fingerprint techniques. FIG. 1 illustrates an exemplary environment 100 incorporating certain embodiments of the present invention.

As shown in FIG. 1, environment 100 includes a user terminal 102, a server 104, a user 106, and a network 110. Other devices may also be included. The user terminal 102 may include any appropriate type of user device, such as a television set (TV) including plasma TV, LCD TV, projection TV, non-smart TV, or smart TV. The user terminal 102 may also include other computing system, such as a personal computer (PC), a tablet or mobile computer, or a smartphone, etc. Further, the user terminal 102 may be any appropriate content-presentation device capable of presenting multiple programs in one or more channels, which may be controlled through a remote control (not shown).

The server 104 may include any appropriate type of server computer or a plurality of server computers for providing personalized contents to the user 106. The server 104 may also facilitate the communication, data storage, and data processing between the other servers and the user terminal 102. The user terminal 102, and server 104 may communicate with each other through one or more communication networks 110, such as cable network, phone network, and/or satellite network, etc.

The user 106 may interact with the user terminal 102 to query and to retrieve various contents or watch programs and perform other activities of interest, or the user may simply use hand or body gestures to control the user terminal 102 if motion sensor or depth-camera is used by the user terminal 102. The user 106 may be a single user or a plurality of users, such as family members.

Figure 2:
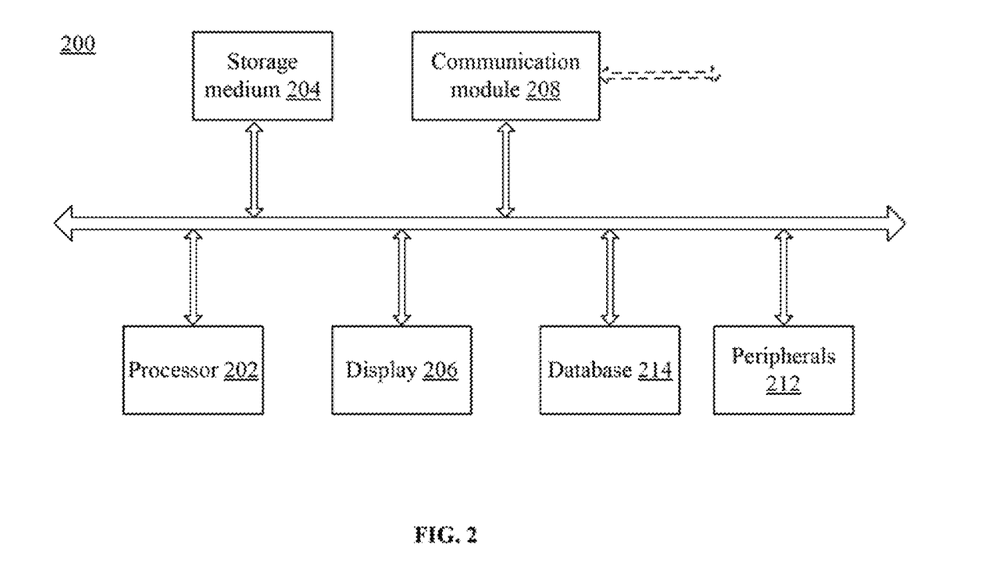
FIG. 2 illustrates an exemplary computing system consistent with the disclosed embodiments.

The user terminal 102, and/or server 104 may be implemented on any appropriate computing circuitry platform. FIG. 2 shows a block diagram of an exemplary computing system capable of implementing the user terminal 102, and/or server 104.

As shown in FIG. 2, the computing system 200 may include a processor 202, a storage medium 204, a display 206, a communication module 208, a database 214, and peripherals 212. Certain devices may be omitted and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes, when the computer programs are executed by processor 202.

Further, peripherals 212 may include various sensors and other I/O devices, such as keyboard and mouse, and communication module 208 may include certain network interface devices for establishing connections through communication networks. Database 214 may include one or more databases for storing certain data and for performing certain operations on the stored data, such as database searching.

Figure 3:
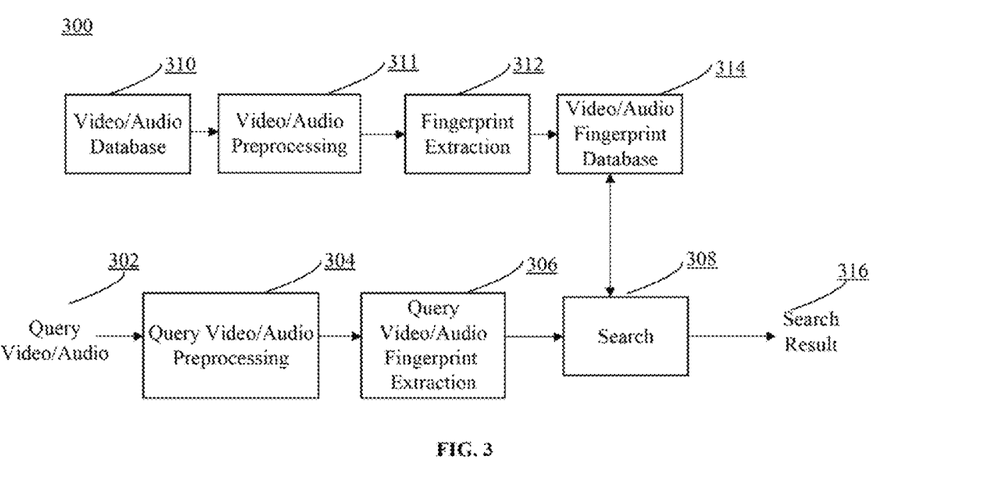
FIG. 3 illustrates an exemplary system for video/audio content retrieval based on rate-coverage optimization consistent with the disclosed embodiments.

The user terminal 102 and/or server 104 may implement a content retrieval system for user 106. FIG. 3 illustrates an exemplary content (e.g., video and/or audio) retrieval system 300 based on the concept of rate-coverage optimization using fingerprinting techniques.

As shown in FIG. 3, the content retrieval system 300 includes a query video/audio 302, a query video/audio preprocessing module 304, a query video/audio fingerprint extraction module 306, a search module 308, a video/audio database 310, a video/audio preprocessing module 311, a video/audio fingerprint extraction module 312, a fingerprint database 314, and a search result 316. Certain components may be omitted and other components may be added. The content retrieval system 300 (e.g., the various components) may be implemented in hardware, software, or a combination of hardware and software.

In operation, the content retrieval system 300 may create and store a large amount of contents and also create a video/audio fingerprint database for storing fingerprints of the contents. A user may then, through a user terminal, query the content retrieval system 300 by video and/or audio to retrieve desired contents from the content retrieval system 300. Further, an application may also automatically query the content retrieval system 300 and retrieve corresponding contents from the content retrieval system 300.

Figure 4:
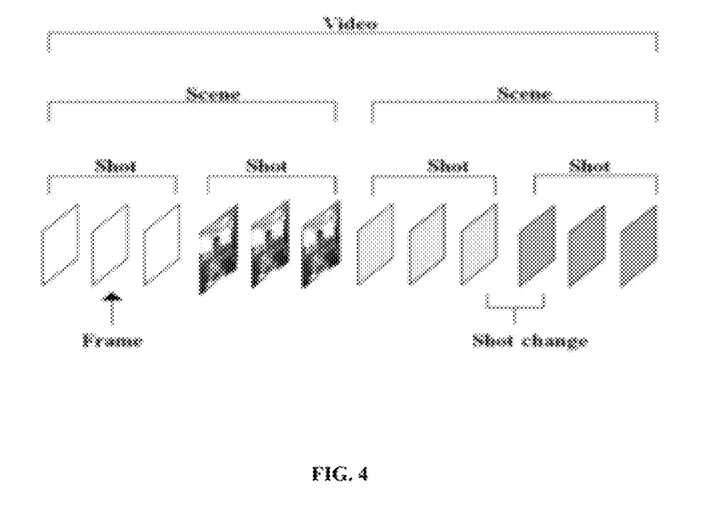
FIG. 4 illustrates a video/audio sequence being divided into different video/audio components consistent with the disclosed embodiments.

The query video/audio 302 may include any appropriate type of video/audio from various video/audio sources. The query video/audio 302 may also include both video/audio data and metadata. FIG. 4 illustrates a video stream being divided into different video components.

As shown in FIG. 4, a video stream may be divided into scenes; a scene may be divided into shots; and a shot may be divided into frames, etc. The frame can be further divided into objects, and features of the video frame may be extracted for further processing. The audio data may be presented independently or separately from the video data, or the audio data may be presented together with the video data.

Returning to FIG. 3, the query video/audio preprocessing module 304 may be configured to carry out video/audio signal conversion, noise cancellation, resampling and filtering of the query video/audio. The query video/audio preprocessing module 304 may reside within the user terminal 102 or outside the user terminal 102 depending on particular applications.

The query video/audio fingerprint extraction module 306 may be configured to extract at least one fingerprint representing at least one query video frame or an audio sequence from the query video/audio 302. For example, the video/audio fingerprint extraction module 306 may use a predetermined feature extraction algorithm to extract a feature of the query video frame representing the characteristic information of the query video frame, and/or may use a predetermined audio feature extraction algorithm to extract a feature of the query audio sequence. That is, either or both of video features and audio features may be used.

Further, the search module 308 may be configured to calculate similarity between a query fingerprint and selected fingerprints to search for a match for the query fingerprint from the fingerprint database 314 within an optimized coverage, so as to determine one or more most similar fingerprints in the fingerprint database.

Further, the video/audio database 310 or content database 310 may include any appropriate database to store video/audio sequences and/or metadata of the video/audio sequences, i.e., the contents to be retrieved based on the query video/audio.

The function of the video/audio preprocessing module 311 is similar to the function of the query video/audio preprocessing module 304. The video/audio preprocessing module 311 may be configured to carry out video/audio signal conversion, noise cancellation, resampling and filtering of the video/audio sequences stored in the video/audio database 310.

The video/audio fingerprint extraction module 312 may be configured to extract a plurality of video/audio fingerprints from a plurality of video frames or audio sequences in each of video/audio sequences stored in the video/audio database 310. More specifically, the video/audio fingerprint extraction module 312 uses the same predetermined feature extraction algorithm(s) used by the query video/audio fingerprint extraction module 306 to extract video/audio fingerprints form the plurality of video/audio frames. That is, both or either video features or audio features can be used to query the content retrieval system 300.

The fingerprint database 314 may be configured to store the plurality of video/audio fingerprints extracted from a large library of video/audio sequences and corresponding metadata such as a video/audio title.

The search result 316 may be outputted by the search module 308. That is, based on information obtained from the query video/audio extraction module 306 and the fingerprint database 314, the search module 308 may find a close enough match for extracted fingerprints within the fingerprint database 314 to generate the search result 316.

Figure 5:
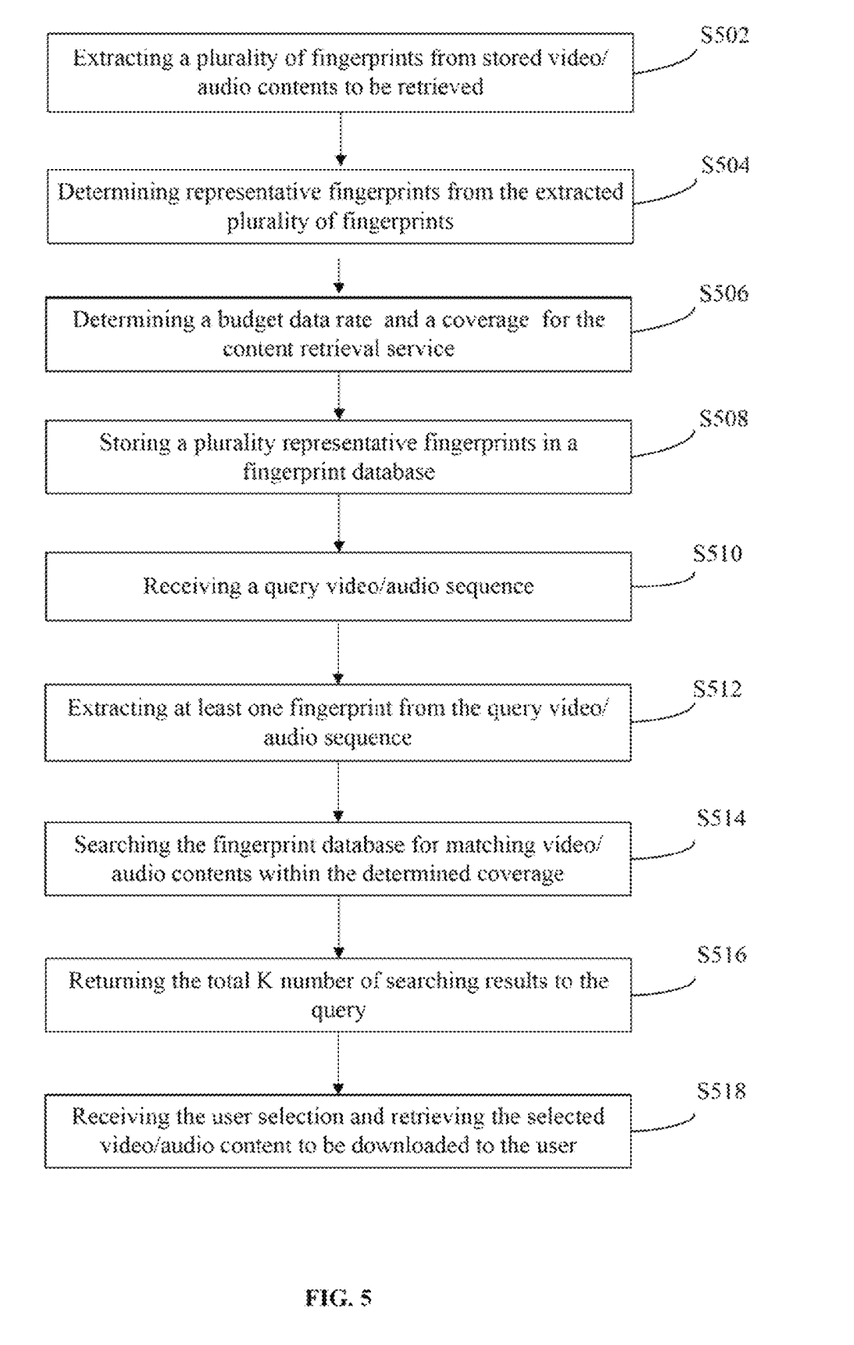
FIG. 5 illustrates an exemplary process performed by various modules in a system for video/audio retrieval based on rate-coverage optimization using fingerprints consistent with the disclosed embodiments.

FIG. 5 illustrates an exemplary process performed by various modules in the content retrieval system 300 based on the rate-coverage optimization using fingerprints consistent with the disclosed embodiments.

As shown in FIG. 5, at the beginning, fingerprints of stored video/audio contents to be retrieved are extracted based on predetermined algorithms (S502). More specifically, every video/audio sequence in the video/audio content database may first be divided into a plurality of video frames and audio sequences.

Because a video is a sequence of frames and the changes between consecutive frames are relatively small due to typical frame rate for a video (e.g., 25 frames/second), instead of dealing with each frame individually, some grouping or clustering techniques may be applied to separate the whole video into different sets of frames with each set has similar frames for further processing. Further, representative frames may be determined to represent similar frames. Similarly, audio content may also be divided into a series audio sequence and representative sequences may be determined to represent similar audio sequence.

Figure 6:
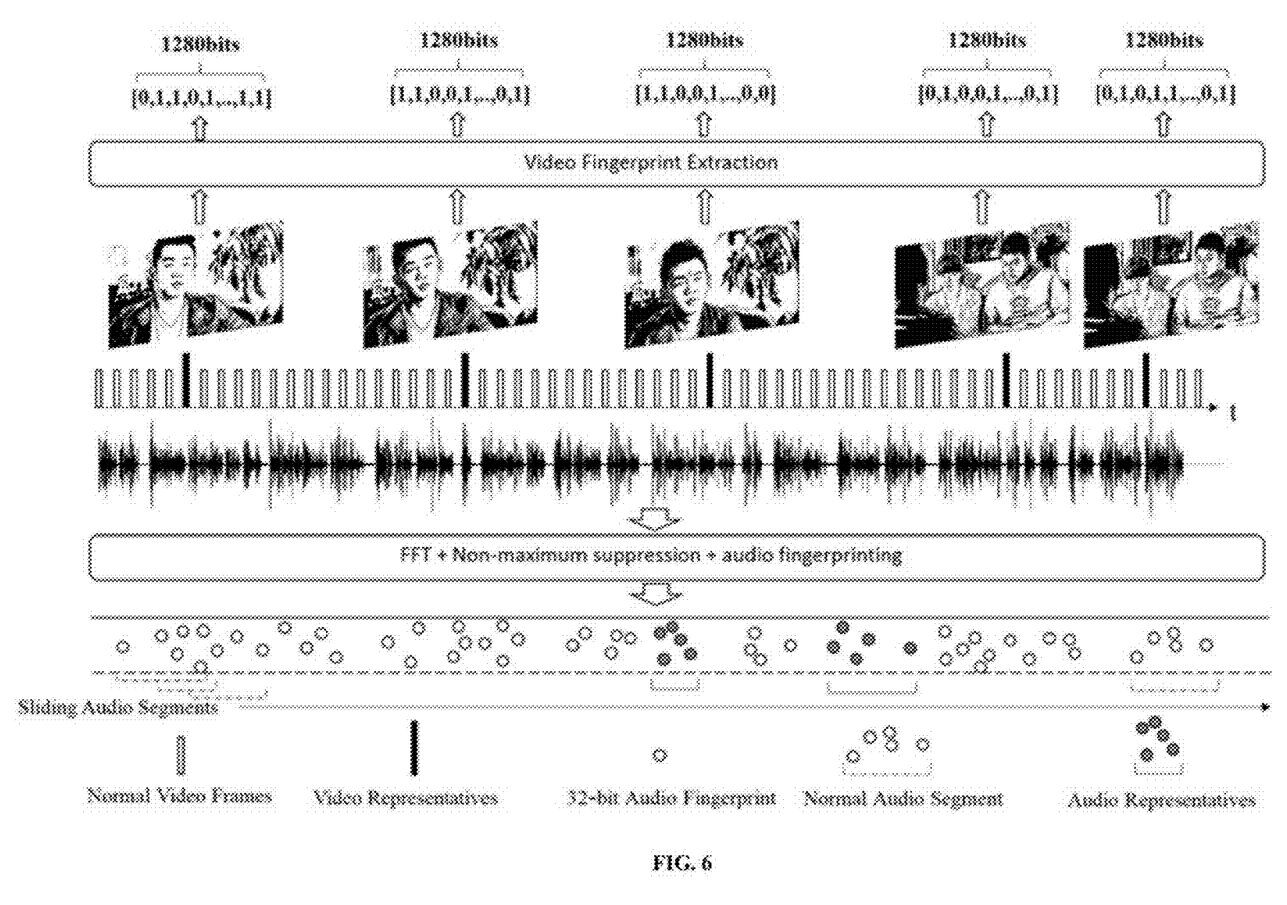
FIG. 6 illustrates an exemplary fingerprint presentation for video and audio content consistent with the disclosed embodiments.

Further, fingerprints for the video frames and the audio sequences are extracted. The video/audio fingerprints can be feature information to uniquely identify video/audio signals. Generally, each video/audio fingerprint corresponds to a certain segment of video/audio. FIG. 6 illustrates exemplary video and audio fingerprints consistent with the disclosed embodiments.

As shown in FIG. 6, for video frames, the fingerprints are fixed-size feature vectors, while for audio segments, a fingerprint is a group of fixed-size feature points. For both video and audio, the term representatives are used to represent the video frames and audio segments stored for the service.

Further, representative video fingerprints and representative audio fingerprints are determined (S504). The representative video fingerprints represent the video frames and the representative audio fingerprints represent audio sequences. A budget data rate of the content retrieval system 300 and a coverage may also be determined for the content retrieval service (S506).

To achieve a desired accuracy of retrieving intended contents based on these visual and audio fingerprints as well as a minimum data rate storage requirement, the content retrieval system 300 provides the service based on the concept of coverage transformed from the accuracy using the visual and audio fingerprints. In certain embodiments, the data rate may indicate a storage limitation for storing the representative video fingerprints and representative audio fingerprints, and the coverage may indicate a number of searching results to be returned or a number of representative fingerprints to be returned as search results.

The number of video representatives and audio representatives are denoted here by $N_V$ and $N_A$, respectively. For video frames, the fingerprints are fixed-size feature vectors, therefore the cost of each video representative is of equal bits, denoted here by a constant $B_V$. Note that the audio fingerprints are natural key points of non-uniform density distribution, which are pre-process to derive audio segments, within which the numbers of key points are equivalent. Thus, for each audio segment, the bitrate it costs to select a representative audio frame is also uniform, denoted here by another constant $B_A$. The data rate, denoted here by R, is the total amount of data stored for providing the service, i.e., the overall bits.

$$R = B_V \times N_V + B_A \times N_A \tag{1}$$

Thus, one problem to solve for the service is to maximize query accuracy $A_t$, given limited bitrate quote $R_{budget}$, where $A_t=1$ if satisfactory result is retrieved, otherwise $A_t=0$. Since the selection of incoming query from the user is a random process, the expected query accuracy is evaluated considering all possible queries. The expected value of accuracy can be defined as:

$$E(A) = \frac{1}{T} \sum_{t=1}^{T} A_t \tag{2}$$

Thus the original problem can be converted to the following formulation:

$$\text{Maximize } E(A) \text{ s.t. } R \leq R_{budget} \tag{3}$$

In the content retrieval system 300, certain amount of fingerprints from video frames and audio segments may be selected as video and audio representatives, respectively, before the query process. Each representative holds a set of K-nearest neighbors in a feature space. Upon each query, the set with the most similar representative may be returned as query results. In practice, a query result may be considered as satisfactory if a correct frame is included in the set with maximum size K, where K is the user tolerance of how many results can be returned upon each query. In other words, if query frame is within the K-nearest neighbors of any representative frame, the query result is considered as correct, i.e., the accuracy is 1.

With such definition of satisfactoriness and correctness of results, the query performance can be evaluated with a new criterion, based on the dataset representation. That is, the estimated Accuracy is translated into Coverage, i.e., the amount of video frames and audio segments in the dataset that are correct or, in other words, within the K-nearest neighbors of certain representatives. Coverage is a property of such representatives, denoted here by C.

Therefore, equation (3) can be converted to:

$$\text{Maximize } C, \text{ s.t. } R \le R_{budget} \quad (4)$$

Where C, the fused coverage of representatives in dataset, is balanced between the coverage of video($C_V$) and audio ($C_A$) via a weight control parameter $\alpha$:

$$C = \alpha C_{V,N_V} + (1-\alpha) C_{A,N_A} \quad (5)$$

Where $\alpha \in [0,1]$, is selected for different media sources based on experiment results.

Thus, the maximum coverage given the number of representatives can be found by an optimization process named Disk Covering Problem with Most K points. More specifically, in order to find the maximum coverage given $N_A$ and $N_V$, a RKCP3 algorithm may be employed for optimization.

The RKCP3 algorithm is designed to solve the Disk Partial Covering Problem: Given k disks with the same radius r, the partial covering issue investigates the center locations of those k disks to cover the most points among total n points.

In the maximum coverage context, the problem is to find the $N_V$ number of video representatives to cover the most frames among total number of video frames, and to find the $N_A$ number of audio representatives to cover the most segments among total number of video segments. The radius r is determined by global constraint of user tolerance to provide K-nearest neighbor, i.e., the radius is constrained by the maximum covered range for each representative, which is fixed for entire database.

For each point $v_i \in V$, $G_i$ ($E_i$, respectively) is denoted as the set of points that are within distance r (3r, resp.) from $v_i$. The set $G_i$ is referred as representatives of radius r and the set $E_i$ as the corresponding expanded representatives of radius 3r. The RKCP3 algorithm procedure to cover the most video frames or audio segments can be described as follows from the original 3-approximation algorithm as follows.

Construct all representatives and corresponding expanded representatives
For i=1, . . . , k, do
Let $G_i$ be the heaviest representative, i.e. contains the most uncovered frames or segments.
Mark as covered all frames/segments in the corresponding expanded representative $E_i$.
Update all the representatives and expanded representatives, i.e., remove from them all covered frames/segments.
Return{$G_1, G_2, \ldots, G_k$}

Thus, the above algorithm may be a 3-approximation algorithm and the time complexity for the problem may be O(k·n).

Accordingly, the maximum coverage given the number of representatives may be only dependent on the number of representatives and, therefore, we have:

$$C_{V,N_V} = f_V(N_V) \quad (6)$$

$$C_{A,N_A} = f_A(N_A) \quad (7)$$

Where $f_V(N_V)$ and $f_A(N_A)$ are the optimization processes for video/audio and audio respectively.

Thus, the Equation (4) can be rewritten as:

$$\max_{N_V, N_A} (\alpha f_V(N_V) + (1-\alpha) f_A(N_A)), \quad (8)$$

$$\text{subject to: } B_V \times N_V + B_A \times N_A \le R_{budget}$$

A solution to the optimization problem (8) may be derived using the Lagrange multiplier method to relax the bitrate constraint, so that the relaxed problem can be solved using a shortest path algorithm. First, the Lagrangian cost function can be denoted as $$J_\lambda(N_V, N_A) = (\alpha f_V(N_V) + (1-\alpha) f_A(N_A)) + \lambda(B_V \times N_V + B_A \times N_A) \quad (9)$$

where $\lambda$ is called the Lagrange multiplier. It has been proven that if there is a $\lambda^*$ such that $\{N_V^*, N_A^*\} = \text{argmax}_{N_V, N_A} J_{\lambda^*}(N_V, N_A)$, and which leads to $R = R_{budget}$, then $\{N_V^*, N_A^*\}$ is an optimal solution to problem (8). Therefore, if the optimal solution to $\max(J_\lambda(N_V, N_A))$ can be found, then the optimal $\lambda^*$ and approximation to the constrained problem (8) can be found.

Figure 7:
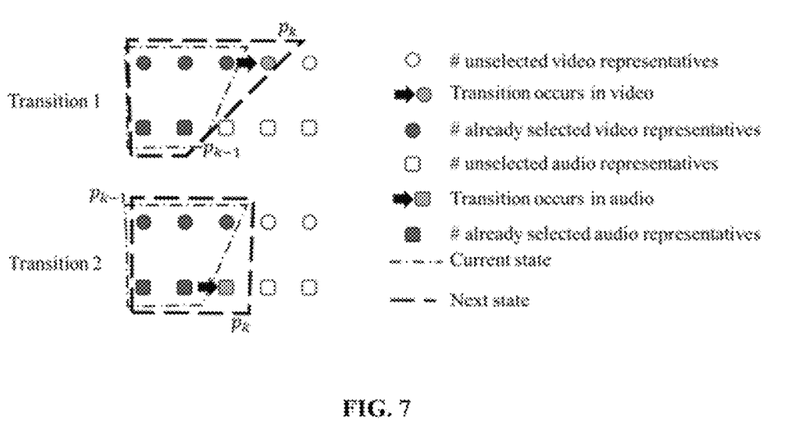
FIG. 7 illustrates an exemplary state transition in an algorithm consistent with the disclosed embodiments.

Further, in order to compute the maximal J, each state will need the status of $N_V$ and $N_A$ at the same time. Provided that a node tuple (i, j) is defined to indicate state ($N_V$, $N_A$) in Shortest Path space, denoted as $p_k$, which has two paths from previous state $p_{k-1}$. FIG. 7 illustrates exemplary transitions from previous state to current state. Therefore, starting from (0, 0) to termination state ($\overline{N_V}, \overline{N_A}$), dynamic programming can be used to solve for the optimal solution of problem (8) based on two-dimensional DAG Shortest Path Algorithm.

Under dynamic programming, to solve the optimization problem in (8), a cost function $T(p_k)$ may be created, which represents the cost to include state (i, j) in the state space:

$$T(p_k) = \max\{\alpha f_V(i) + (1-\alpha) f_A(j) + \lambda(B_V \times i + B_A \times j)\} \quad (10)$$

The sub-problem $f_V$ and $f_A$ are the optimization problem to maximize coverage of video and audio, given $N_V$ and $N_A$, respectively. The observation is, despite the fact that the selection of representative frames are irrelevant to the previous state, the delta cost:

$$\Delta(p_{k-1}, p_k) = \quad (11)$$
$$\begin{cases} \alpha[f_V(i) - f_V(i-1)] + \lambda B_V, & \text{if transition occurs in video} \\ (1-\alpha)[f_A(j) - f_A(j-1)] + \lambda B_A, & \text{if transition occurs in audio} \end{cases}$$

which is independent of the selection of the previous states $p_0, p_1, \ldots, p_{k-2}$. Therefore, cost function $$T(P_k) = \max(T(P_{k-1}) + \Delta(p_{k-1}, p_k)) \quad (12)$$

can be solved in DP algorithm.

Thus, a desired or maximized coverage can be determined within a predetermined data rate limitation with the desired content retrieval accuracy (e.g., the accuracy is 1 or the correct search result is included), so-called rate-coverage optimization.

Further, returning to FIG. 5, after the data rate and the coverage are determined, the representative video fingerprints and representative audio fingerprints within the data rate requirement can be stored in a fingerprint database (S508). The fingerprint database may be implemented in the form of a search tree, or other appropriate data structures, and may also be indexed. The plurality of video/audio representative fingerprints of the video/audio contents and corresponding metadata such as a video/audio title may be stored in the fingerprint database.

After the representative fingerprints of the video/audio content are stored in the fingerprint database, the content retrieval system 300 may finishes service setup phase and ready to provide the query service and content retrieval services. More specifically, during operation, a query video/audio sequence is received (S510). Either video or audio or both video and audio query may be received and processed.

After the query is received, at least one fingerprint may be extracted from the query video/audio sequence (S512). The submitted query (video/audio) may include any appropriate type of source for video/audio contents and may contain various video/audio sources. The contents from the query video/audio may include both video/audio data and metadata. A plurality of frames may be associated with the submitted query video and may be provided for fingerprint extraction and, similarly, audio sequences may be associated with the submitted query audio and may be provided for fingerprint extraction. Further, because the content retrieval system 300 provides a service that is responsive to the user queries for content retrieval, both the stored contents (video/audio) and the queries are transformed into fingerprints of video frames and audio segments based on the same fingerprint extraction algorithms.

Further, using the at least one fingerprint of the query video/audio, the fingerprint database is searched for matching video/audio contents within the determined coverage (S514). The at least one query fingerprint may include a video query fingerprint and an audio query fingerprint both representing the query, and the matching may be performed based on either the video query fingerprint or the audio query fingerprint. In certain embodiments, both the video query fingerprint and the audio query fingerprint may be used for matching. Additionally, more than one video query fingerprint and/or more than one audio query fingerprint may be included.

During the matching process, a total K number of video/audio contents or representatives of the contents that are matching the most with the fingerprint of the query video/audio are determined as search results, where K is a total number of contents based on the determined coverage or a total number of representative fingerprints based on the determined coverage.

Further, the total K number of searching results are returned to the query (S516). For example, the K number of searching results are returned to the user, and may also be presented to the user in various display formats. The user may select a desired video/audio content from the searching results presented to the user. The content retrieval system 300 may receive the user selection and retrieve the video/audio content to be downloaded to the user (S518). The selection of the user may be considered as a confirmation of the search accuracy and such information may be fed back to the algorithms for further optimization.

Thus, by using the framework for multimedia content retrieval systems with optimal query accuracy given limited bitrate quote, an optimization method is provided to convert an NP-hard problem into a polynomial time solvable optimization problem. By applying this framework, the amount of storage and transmission time can be greatly saved whilst providing desired retrieval performance upon content query tasks.

It should be noted that, the concept for the video/audio retrieval systems and methods can be extended to other services. For example, the disclosed video/audio retrieval methods and systems may be integrated on smart TV systems and/or smart terminals to help organize and share produced information valuable to assist in detecting and removing copyright infringing or perceptually identical video/audio content from the databases of such websites and prevent any future uploads made by users of these websites, to perform image and/or audio based identification or recognition, etc. Further, the video/audio fingerprinting may also be used for broadcast monitoring (e.g., advertisement monitoring, news monitoring) and general media monitoring. Broadcast monitoring solutions can inform content providers and content owners with play lists of when and where their video/audio content was used.

The disclosed systems and methods can also be extended to other devices with displays, such as smartphones, tablets, PCs, smartwatches, and so on, to perform video/audio retrieval. Other steps may be referred to above descriptions with respect to the system for video/audio retrieval based on optimized selected fingerprints. Other applications, advantages, alternations, modifications, or equivalents to the disclosed embodiments are obvious to those skilled in the art.

What is claimed is:

1. A content retrieval method, comprising:
   extracting a plurality of fingerprints including a plurality of video fingerprints and a plurality of audio fingerprints from contents stored in a content database, the contents having video frames corresponding to the plurality of video fingerprints and associated audio sequences corresponding to the plurality of audio fingerprints;
   determining representative video fingerprints of the video frames and representative audio fingerprints of the audio sequences;
   determining a data rate indicating a storage limitation and a coverage indicating a number of searching results to be returned;
   storing selected representative video fingerprints and representative audio fingerprints based on the storage limitation indicated by the data rate in a fingerprint database;
   receiving a query containing at least one of video data and audio data submitted by a user;
   extracting at least one query fingerprint representing the query;
   determining a number of fingerprints most matching the at least one query fingerprint based on the coverage to generate search results indicating matching contents represented by the number of most matching fingerprints; and
   returning the search results to the user.

2. The content retrieval method according to claim 1, further comprising:
   receiving a selection from the user from the search results; and
   retrieving content corresponding to the selection from the content database.

3. The content retrieval method according to claim 1, wherein:
   the at least one query fingerprint including a video query fingerprint and an audio query fingerprint both representing the query; and
   the most matching fingerprints are matched with the video query fingerprint or the audio query fingerprint.

4. The content retrieval method according to claim 1, wherein:
the plurality of video fingerprints are fixed-size feature vectors of the video frames; and
the plurality of audio fingerprints are fixed-number of natural key points of a density distribution of the audio sequences.

5. The content retrieval method according to claim 3, wherein:
the video query fingerprint and the audio query fingerprint are extracted from the query using same predetermined fingerprint extraction algorithms for extracting the plurality of video fingerprints and the plurality of audio fingerprints from the contents.

6. The content retrieval method according to claim 1, wherein determining the data rate and the coverage further includes:
determining the data rate indicating the storage limitation and the coverage indicating the number of searching results to be returned based on rate-coverage optimization.

7. The content retrieval method according to claim 6, wherein determining the data rate and the coverage further includes:
the storage limitation is storage space based on a total number of representative video fingerprints and representative audio fingerprints.

8. The content retrieval method according to claim 6, wherein:
the coverage indicates, within tolerance of users, a number of searching results to be returned that include a correct search result.

9. The content retrieval method according to claim 6, wherein:
the rate-coverage optimization is an optimization finding a maximum coverage given a total number of representative fingerprints stored and including a correct search result.

10. The content retrieval method according to claim 9, wherein:
the rate-coverage optimization is represented by finding:

$$\max_{N_V, N_A} (\alpha f_V(N_V) + (1-\alpha) f_A(N_A)),$$

subject to: $B_V \times N_V + B_A \times N_A \leq R_{budget}$ wherein $N_V$ and $N_A$ denote number of video representative fingerprints and audio representative fingerprints, respectively; $f_V(N_V)$ and $f_A(N_A)$ are the optimization processes for video and audio, respectively; $\alpha \in [0,1]$; $B_V$ and $B_A$ are sizes of each video representative fingerprint and audio representative fingerprint, respectively; and $R_{budget}$ is the data rate.

11. A non-transitory computer-readable medium having computer program for, when being executed by a processor, performing a content retrieval method, the method comprising:
extracting a plurality of fingerprints including a plurality of video fingerprints and a plurality of audio fingerprints from contents stored in a content database, the contents having video frames corresponding to the plurality of video fingerprints and associated audio sequences corresponding to the plurality of audio fingerprints;
determining representative video fingerprints of the video frames and representative audio fingerprints of the audio sequences;
determining a data rate indicating a storage limitation and a coverage indicating a number of searching results to be returned;
storing, selected representative video fingerprints and representative audio fingerprints based on the storage limitation indicated by the data rate in a fingerprint database;
receiving a query containing at least one of video data and audio data submitted by a user;
extracting at least one query fingerprint representing the query;
determining a number of fingerprints most matching the at least one query fingerprint based on the coverage to generate search results indicating matching contents represented by the cumber of most matching fingerprints; and
returning the search results to the user.

12. The non-transitory computer-readable medium according to claim 11, the method further comprising:
receiving a selection from the user from the search results; and
retrieving content corresponding to the selection from the content database.

13. The non-transitory computer-readable medium according to claim 11, wherein:
the at least one query fingerprint including a video query fingerprint and an audio query fingerprint both representing the query; and
the most matching fingerprints are matched with the video query fingerprint or the audio query fingerprint.

14. The non-transitory computer-readable medium according to claim 11, wherein:
the plurality of video fingerprints are fixed-size feature vectors of the video frames; and
the plurality of audio fingerprints are fixed-number of natural key points of a density distribution of the audio sequences.

15. The non-transitory computer-readable medium according to claim 13, wherein:
the video query fingerprint and the audio query fingerprint are extracted from the query using same predetermined fingerprint extraction algorithms for extracting the plurality of video fingerprints and the plurality of audio fingerprints from the contents.

16. The non-transitory computer-readable medium according to claim 11, wherein
determining the data rate and the coverage further includes:
determining the data rate indicating the storage limitation and the coverage indicating the number of searching results to be returned based on rate-coverage optimization.

17. The non-transitory computer-readable medium according to claim 16, wherein
determining the data rate and the coverage further includes:
the storage limitation is storage space based on a total number of representative video fingerprints and representative audio fingerprints.

18. The non-transitory computer-readable medium according to claim 16, wherein:
the coverage indicates, within tolerance of users, a number of searching results to be returned that include a correct search result.

19. The non-transitory computer-readable medium according to claim 16, wherein:
   the rate-coverage optimization is an optimization finding a maximum coverage given a total number of representative fingerprints stored and including a correct search result.

20. The non-transitory computer-readable medium according to claim 19, wherein:
   the rate-coverage optimization is represented by finding:

$$\max_{N_V, N_A} (\alpha f_V(N_V) + (1-\alpha) f_A(N_A)),$$

$$\text{subject to: } B_V \times N_V + B_A \times N_A \leq R_{budget}$$

wherein $N_V$ and $N_A$ denote number of video representative fingerprints and audio representative fingerprints, respectively; $f_V(N_V)$ and $f_A(N_A)$ are the optimization processes for video and audio, respectively; $\alpha \in [0,1]$; $B_V$ and $B_A$ are sizes of each video representative fingerprint and audio representative fingerprint, respectively; and $R_{budget}$, is the data rate.

* * * * *